(12) United States Patent
Shambaugh et al.

(10) Patent No.: US 7,460,659 B2
(45) Date of Patent: Dec. 2, 2008

(54) BEST PRACTICES LEARNING FOR AGENTS IN A COMMUNICATION SYSTEM

(75) Inventors: Craig R. Shambaugh, Wheaton, IL (US); Roger A. Sumner, Batavia, IL (US); Mark J. Power, Carol Stream, IL (US); Carlo Bonifazi, Woodridge, IL (US); Jeffrey D. Hodson, Wheaton, IL (US); Mark J. Michelson, Elburn, IL (US); Robert P. Beckstrom, Bolingbrook, IL (US); Anthony J. Dezonno, Bloomingdale, IL (US)

(73) Assignee: Rockwell Electronic Commerce, Wood Dale, IL (US)

(*) Notice: Subject to any disclaimer, the term of this patent is extended or adjusted under 35 U.S.C. 154(b) by 446 days.

(21) Appl. No.: 10/259,358

(22) Filed: Sep. 27, 2002

(65) Prior Publication Data
US 2004/0062381 A1 Apr. 1, 2004

(51) Int. Cl.
H04M 3/00 (2006.01)
H04M 5/00 (2006.01)
(52) U.S. Cl. ............... 379/265.02; 379/265.01; 379/265.05; 379/265.06; 379/266.08
(58) Field of Classification Search ............ 379/265.02, 379/265.05, 88.19, 265.06, 265.01, 32.01, 379/266.08; 704/2; 434/111; 700/83
See application file for complete search history.

(56) References Cited

U.S. PATENT DOCUMENTS

| | | | |
|---|---|---|---|
| 5,554,031 A | * | 9/1996 | Moir et al. ............ 434/111 |
| 5,555,179 A | | 9/1996 | Koyama et al. |
| 5,757,644 A | * | 5/1998 | Jorgensen et al. ............ 700/83 |
| 5,765,033 A | | 6/1998 | Miloslavsky |
| 5,926,539 A | | 7/1999 | Shtivelman |
| 5,946,387 A | | 8/1999 | Miloslavsky |
| 5,953,332 A | | 9/1999 | Miloslavsky |
| 5,953,405 A | | 9/1999 | Miloslavsky |
| 5,982,857 A | * | 11/1999 | Brady ............ 379/88.19 |
| 6,002,760 A | | 12/1999 | Gisby |
| 6,021,428 A | | 2/2000 | Miloslavsky |
| 6,044,145 A | | 3/2000 | Kelly et al. |
| 6,044,368 A | | 3/2000 | Powers |
| 6,067,357 A | | 5/2000 | Kishinsky et al. |
| 6,108,711 A | | 8/2000 | Beck et al. |
| 6,128,380 A | * | 10/2000 | Shaffer et al. ............ 379/265.01 |
| 6,138,139 A | | 10/2000 | Beck et al. |
| 6,167,395 A | | 12/2000 | Beck et al. |
| 6,170,011 B1 | | 1/2001 | Beck et al. |

(Continued)

Primary Examiner—Thjuan K Addy
(74) Attorney, Agent, or Firm—Husch Blackwell Sanders Welsh & Katz (57) ABSTRACT

The method and apparatus teach agents in a communication system, such as an automatic call distribution system. In a first step of one embodiment of the method, a previously stored call transaction having a plurality of dialog portions and decision points is provided to the agent. The call transaction is replayed, and at least one decision of the respective decision point in the call transaction is simulated. This simulation is different than an original decision at the respective decision point in the call transaction. The results are evaluated and presented to the agent. In one embodiment at least one decision is a best practice decision. Also, the method further may overlay preferred paths of a call transaction based on stored best practice call transactions. The apparatus implements the method for replaying call transactions.

23 Claims, 7 Drawing Sheets

U.S. PATENT DOCUMENTS

| | | |
|---|---|---|
| 6,175,563 B1 | 1/2001 | Miloslavsky |
| 6,175,564 B1 | 1/2001 | Miloslavsky et al. |
| 6,185,292 B1 | 2/2001 | Miloslavsky |
| 6,263,049 B1 * | 7/2001 | Kuhn ................. 379/32.01 |
| 6,324,282 B1 * | 11/2001 | McIllwaine et al. .... 379/265.06 |
| 6,345,305 B1 | 2/2002 | Beck et al. |
| 6,373,836 B1 | 4/2002 | Deryugin et al. |
| 6,389,007 B1 | 5/2002 | Shenkman et al. |
| 6,393,015 B1 | 5/2002 | Shtivelman |
| 6,732,156 B2 | 5/2004 | Miloslavsky |
| 6,914,975 B2 * | 7/2005 | Koehler et al. ......... 379/265.05 |
| 2004/0030541 A1 * | 2/2004 | Chou et al. ................. 704/2 |

* cited by examiner

BEST PRACTICES LEARNING FOR AGENTS IN A COMMUNICATION SYSTEM

BACKGROUND

The field of the invention relates to communication systems and, in particular, to communication systems having automatic call distributors.

Automatic call distribution systems are known. Such systems are typically used, for example, within private branch telephone exchanges as a means of distributing telephone calls among a group of agents. While the automatic call distributor may be a separate part of a private branch telephone exchange, often the automatic call distributor is integrated into and is an indistinguishable part of the private branch telephone exchange.

Often an organization disseminates a single telephone number to its customers and to the public in general as a means of contacting the organization. As calls are often directed to the organization from the public switch telephone network or other communication network (e.g. Internet), the automatic call distribution system directs the calls to its agents based upon some type of criteria. For example, where all agents are considered equal, the automatic call distributor may distribute the calls based upon which agent has been idle the longest. The agents that are operatively connected to the automatic call distributor may be live agents, and/or virtual agents. Typically, virtual agents are software routines and algorithms that are operatively connected and/or part of the automatic call distributor.

Automatic call distributors are utilized in communications handling centers, such as call centers, that forward incoming communications, such as telephone calls, or other contacts for processing by one of several associated call-handling agents. The term "call" refers herein to any suitable communications including but not limited to, voice-over-Internet protocol communications; electronic mail messages; facsimiles, chat room dialog, instant messages, other Internet contacts. An automatic call distributor is any system which performs the functions of automatically distributing calls to agents while typically maintaining records of the call processing, and may employ a wide variety of architecture made up of software and/or hardware including, for example, integrated centralized systems, distributed systems, systems using one or more personal computers or services, etc.

Telephone call centers, for example, are often used to dispatch emergency services, as telemarketing sales centers, as customer service centers, etc. to automatically distribute received calls. Each incoming call may have a number of handling requirements, depending on, for example, the nature of the call, the originating call area, and the language of the call. Agents, on the other hand, each have abilities to process calls having certain handling requirements. Typically, agents are able to process one or more call types. For example, agents are typically trained to process certain call subject matters and certain call languages.

In some known call centers, computerized automatic call distributors place incoming calls, of a particular type, requiring defined skills, in queues of like calls. Appropriate agents have skills necessary to process calls in the queues, and are assigned to such queues. Agents are often assigned to multiple queues, reflective of their particular handling skills. Typically, this is done to increase the handling capacity of the center by making improved use of available communications handling resources.

Quite often, agents may handle calls related to one or more subject areas, and possess varied attributes that are relevant to all subject areas they are capable of handling. For example, a call center agent may speak multiple languages, and may therefore be able to process calls relating to a particular subject matter in all these languages. One simple approach used to deal with multiple agent attributes is to create and administer individual queues, each of which takes into account the subject matter and the attributes of the agent. This, however, is administratively very cumbersome.

Other known call centers use agent-skill indicators, associated with agents in order to connect calls. In such centers, a call is connected to an agent having an agent-skill indicator matching that of the call, within a group of agents. Agents, however, are typically only assignable to only one, and typically only a single agent-skill indicator is used to connect the call. Disadvantageously, such call centers do not use agent attributes across different groups. This may lead to an inefficient utilization of call center resources. Moreover, these communications handling centers do not allow for easy administration and re-assignment of agents to queues, while maintaining agent skill-sets.

One concern in designing an automatic call distributor system is ensuring that calls are efficiently routed to an agent, so as to minimize the amount of time that any particular call is placed on hold. One basic technique of minimizing on-hold time is to employ a first-in/first-out call handling technique. The first-in/first-out technique requires that calls be routed to the next available agent in the order in which the calls are received. However, in some automatic call distributor systems the agents are specialized in handling particular types of calls, so the first-in/first-out technique is not appropriate. For example in a product support department of a software facility, agents might be grouped according to specialized expertise, so that a first group is knowledgeable in word processing, a second group is knowledgeable in a database program, and a third group is knowledgeable in a spreadsheet program. Utilizing a first-in/first-out technique in such a situation is inappropriate, because a caller with a question regarding the word processing program may be routed to an agent having specialized knowledge regarding the database program or the spreadsheet program, rather than being routed to an agent with specialized knowledge in the word processing program.

The focus in the management of calls has been upon maximizing availability to customers, so as to achieve an acceptable profit margin in a competitive environment of customer service. Call management approaches that increase revenue may lead to savings for customers.

Most present-day call-distribution algorithms focus on being "fair" to callers and to agents. This fairness is reflected by the standard first-in, first-out call to most-idle-agent assignment algorithm. Skills-based routing improves upon this basic algorithm in that it allows each agent to be slotted into a number of categories based on the agent's skill types and levels.

The primary objective of call-distribution algorithms is to ultimately maximize call center performance. That may involve minimizing cost, maximizing call throughput, and/or maximizing revenue, among others. For example, when a new call arrives, the call may be handled by an agent who either has the ability to produce the most revenue or can handle the call in the shortest amount of time. Also, when an agent becomes available to handle a new call, the agent may handle either the call that has the possibility of generating the most revenue or the call that the agent is most efficient in handling.

Automatic call distributors are often used in the field of telemarketing, which is one of the fastest growing areas of commerce. While some telemarketing calls are informative and well-focused, other calls are viewed as tedious and unwelcome. Often the perception of the telemarketer by the customer is based upon the skill and training of the telemarketer.

In order to maximize the performance of telemarketers, telemarketing organizations usual require telemarketers to follow a predetermined format during presentations. A prepared script is usually given to each telemarketer and the telemarketer is encouraged to closely follow the script during each call. Such scripts are usually based upon expected customer responses and typically follow a predictable story line. Typically, such scripts begin with the telemarketer identifying himself and explaining the reasons for the call. The script will then usually begin with an explanation of the product and the reasons why consumers should wish to have the product. Finally, the script may complete the presentation with an inquiry of whether the customer wants to purchase the product.

While such prepared scripts are sometimes effective, they are often ineffective where a customer asks unexpected questions or where the customer is in a hurry and wishes to complete the conversation as soon as possible. In these cases, a telemarketer will often become flustered or lose track of where he is in the story line. Often a call, which could have resulted in a sale, will result in no sale, and more importantly, an irritated customer. Because of the importance of telemarketing, a need exists for a better method of preparing and training telemarketers. Current autoquality sytems record voice and/or data screens associated with a transaction and allow both the agent and supervisor to review for quality of transaction, they do not allow simulation of the completed transaction with different choice selections that result in different outcomes. Without the simulation of new results based on best practices the agent never has the opportunity to adapt new techniques that increase their ability to improve their performance except in a "live transaction" mode. The ability to simulate multiple decision paths with predicted results allow the contact center agent to practice best methods in a controlled environment.

SUMMARY

To overcome some of the limitations of the prior art, there is provided in one embodiment a method for teaching agents in an automatic call distribution system. In a first step of the embodiment, a previously stored call transaction having a plurality of download portions and decision points is provided to the agent. The call transaction is replayed, and at least one decision of the respective decision point in the call transaction is simulated. This simulation is different than an original decision at the respective decision point in the call transaction. The results are evaluated and presented to the agent. At least one decision in a further embodiment is a best practice decision. Also in a further embodiment, the method further comprises overlaying preferred paths of a call transaction based on stored best practice call transactions.

In a further embodiment, an apparatus teaches agents in an automatic call system wherein a storage device, such as a memory, has at least one previously stored call transaction. This previously stored call transaction is a plurality of dialog portions and decision points. A replay module replays the previously stored call transaction and overlays preferred paths on the call transaction based on stored best practice call transactions. An evaluator evaluates the results of the preferred path and presents the results to the agent.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings. In the several figures like reference numerals identify like elements.

While the present invention is susceptible of embodiments in various forms, there is shown in the drawings and will hereinafter be described some exemplary and non-limiting embodiments, with the understanding that the present disclosure is to be considered an exemplification of the invention and is not intended to limit the invention to the specific embodiments illustrated. In this disclosure, the use of the disjunctive is intended to include the conjunctive. The use of the definite article or indefinite article is not intended to indicate cardinality. In particular, a reference to "the" object or "a" object is intended to denote also one of a possible plurality of such objects.

DETAILED DESCRIPTION

Figure 1:
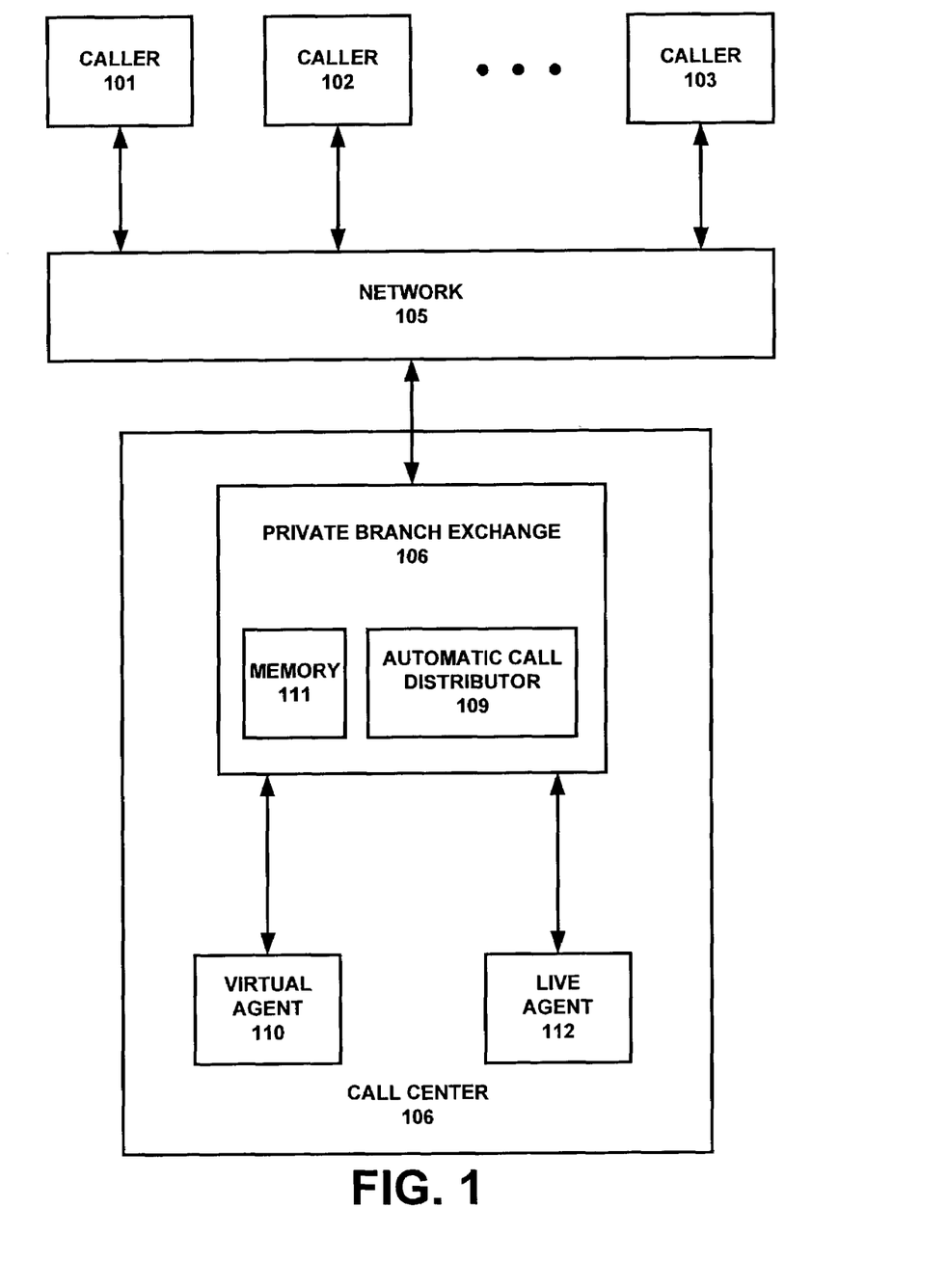
FIG. 1 is a block diagram of an example of a communication system for use with one embodiment of an automatic call distribution system that provides agent teaching.

FIG. 1 is a block diagram of an illustrative example of a telephone system having an automatic call distributor 109 that is part of a private branch exchange switch 108, or other suitable switch in a call center 106. Calls may be connected between callers 101, 102, 103 via network 105 to the automatic call distributor 106. The automatic call distributor 106 may distribute the calls to telemarketers or agents, such as virtual agent 110, or live agent 112. The network 105 may be any appropriate communication system network such as a public switch telephone network, cellular telephone network, satellite network, land mobile radio network, the Internet, etc. Similarly, the automatic call distributor 109 may be in any suitable configuration, for example, a stand-alone unit, a distributed system, integrated in a host computer, etc. Embodiments may be implemented under any of number of different formats. For example, when implemented in connection with a public switch telephone network, a satellite network, a cellular or land mobile radio network, embodiments may operate within a host computer associated with the automatic call distributor and may receive voice information (such as pulse code modulation data) from a switched circuit connection which carries a voice between the callers 101, 102, 103 and the agents 110, 112.

When implemented in connection with the Internet, the embodiments may operate, for example, from within a server. Voice information may be carried between the agents 110, 112 and callers 101, 102, 103 using packets.

As shown in FIG. 1, a caller, such as caller 101, may place a call to the call center 106. The caller 101 typically uses a station set that may be, for example, embodied as a conventional telephone, videophone or personal computer configured with appropriate telephony software and Internet connectivity. The call is routed via the telephone network 105 to the call center 100, in a conventional manner. In the illustrated embodiment of FIG. 1 the call is preferably routed within the call center 100 to a private branch exchange switch 108 that has an automatic call distributor 109. The private branch exchange switch 108 and the automatic call distributor 109 may comprise conventional hardware and software, as modified herein to carry out the functions and operations of the present method and apparatus.

In the embodiment of FIG. 1, the private branch exchange switch 108 and the automatic call distributor 109 form a switching system designed to receive calls destined for call center 100, and queue them when an appropriate agent is not available. In addition, the automatic call distributor 109 distributes calls to agents or specific groups of agents according to a prearranged scheme. The automatic call distributor 109 may be integrated with the private branch exchange 108, as in the illustrative embodiment shown in FIG. 1, or provided by a separate unit, or distributed unit.

Examples of the network 105, includes, but are not limited to, the combination of local and long distance wire or wireless facilities and switches known as the public switched telephone network, as well as cellular network systems and the Internet. The network 105 is utilized to complete calls between (i) a caller at a station set, such as callers 101, 102, 103, and the call center 100; (ii) a caller on hold and a third party; and (iii) a caller on hold and a shared-revenue telephone service, such as a 900 or 976 service, provided by content provider. As is well known, shared-revenue telephone services deliver a particular service over the telephone and subsequently bill the caller. The telephone number from which a call is made typically identifies the caller. A subsequent bill is then included as part of the caller's regular telephone, bill.

The Internet network, as used herein, includes the World Wide Web (the "Web") and other systems for storing and retrieving information using the Internet. To view a web site, the user typically communicates an electronic Web address, referred to as a Uniform Resource Locator ("URL"), associated with the web site. It is noted that if the caller accesses the call center 100 from a conventional telephone, the textual portions of a premium web site may be converted to speech for presentation to the caller.

Embodiments of the present method and apparatus help agents in an automatic call distribution system learn best practices where handling customer transactions. The customer transaction may take many different routes to reach a final disposition. The agent is required to make many different decisions regarding which steps to follow. The course followed may have achieved the desired result, but was not the course considered to be the best practice approach. Best practices approach allows the company to track and set standards upon which a certain set of actions will deliver an expected set of results. The results may be based on different criteria for each transaction type such as; value of transaction: revenue to the company or continued value of the customer to the company, cost of transaction: different questions based on answers received may shorten the transaction handling time or certain questions could be handled utilizing other call center technologies such as Interactive Voice Response. Best practice will vary from business to business and between different vertical markets. One of the advantages in some of the embodiments of the proposed methodology is the flexibility to adapt to any situation and to be flexible enough to change as the user modifies and/or improves their best practices. The agent performs in a reactive mode based on the learned responses acquired over time. The opportunity to replay customer interactions, to try new responses, and to see what would occur provides for valuable self-learning and moves the agent toward the ability to implement best practice procedures.

Figure 2:
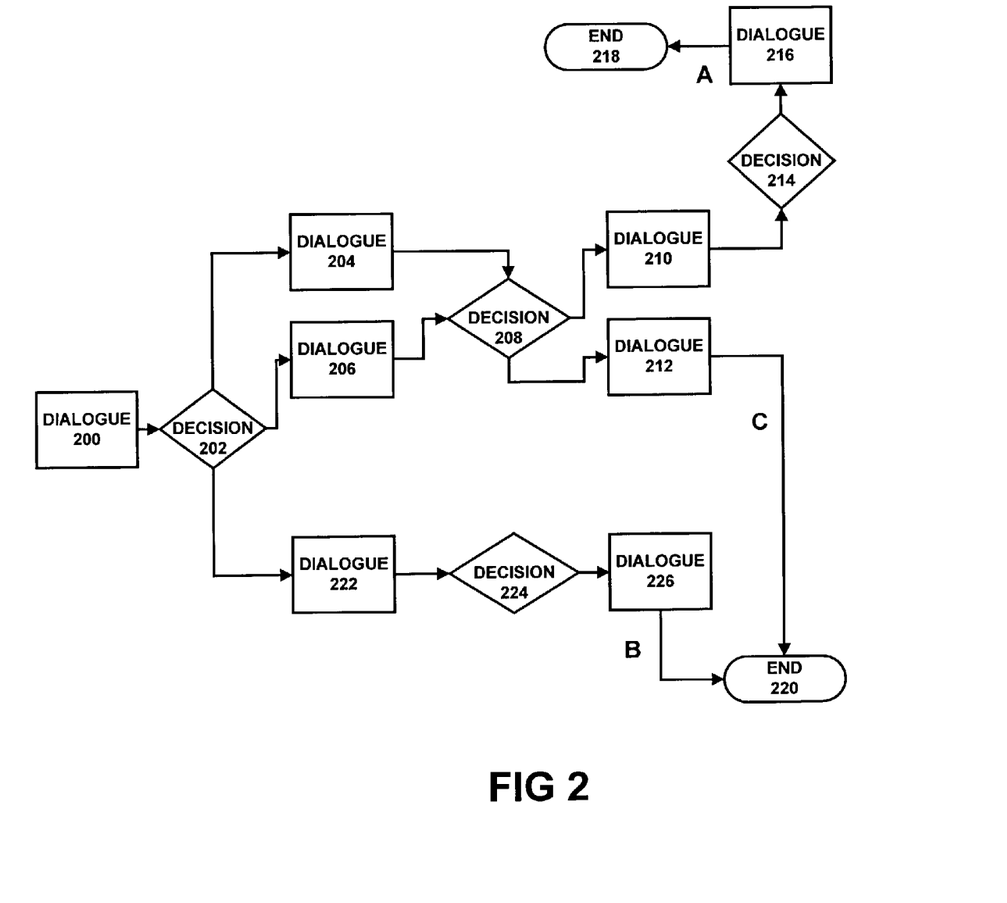
FIG. 2 is diagram depicting an example of a call transaction and various examples of paths with best practice decision steps.

FIG. 2 is a diagram that illustrates an example of how the agent can learn from replaying a call transaction and overlaying on it the best practices simulated call transaction. In the example of FIG. 2, three different paths are indicated by A, B, and C. For this example, let it be assumed that Path C was a stored call transaction. Path A being a preferred best practice call transaction, and Path B being a preferred best practice call transaction that is of less desirability than Path A. All of these paths start with an original dialog between the caller and agent at 200. A decision is then made at 202, which branches the path into three dialogs 204, 206, and 222. Each of the dialogs 204 and 206 lead to a decision point 208. The decision points are junctions within an transaction flow at which point the agent may make a decision to start or end a dialogue and based upon the resulting exchange proceed forward along a selected path. The dialogue is the exchange between the customer and the contact center agent, which may, for example, consist of a question and/or information response to a question. In the decision point 208, the stored call transaction branches to dialog 212, which then terminates at end 220. End 220 may, for example, have been a result in which there was no sale of a product. Path B may have had a best practices step at decision point 202 resulting in dialog 222 which then went to a decision point 224 which resulted in dialog 226 and eventually in determination at end 220. Although this may have been a best practice decision at decision point 202, it would have been a learning exercise for the agent to see that the decision point at 224 resulted in a loss of a sale. Finally, the preferred best practices path A results from a best practice decision at decision point 208 which results in dialog 210 which proceeds through a decision point 214 continuing on to dialog 216 and finally to termination at end 218. This termination at end 218 may be, for example, the successful sale of the product with the customer being very pleased with the outcome.

Thus, it can be seen from FIG. 2 that overlaying the best practice decision steps on the decision points of the original stored call transaction can teach the agent how to improve his call handling abilities. In a further embodiment, it is envisioned that the agent could change in real time the decisions at each of the decision points to see what effect that would have on the call transaction.

Figure 3:
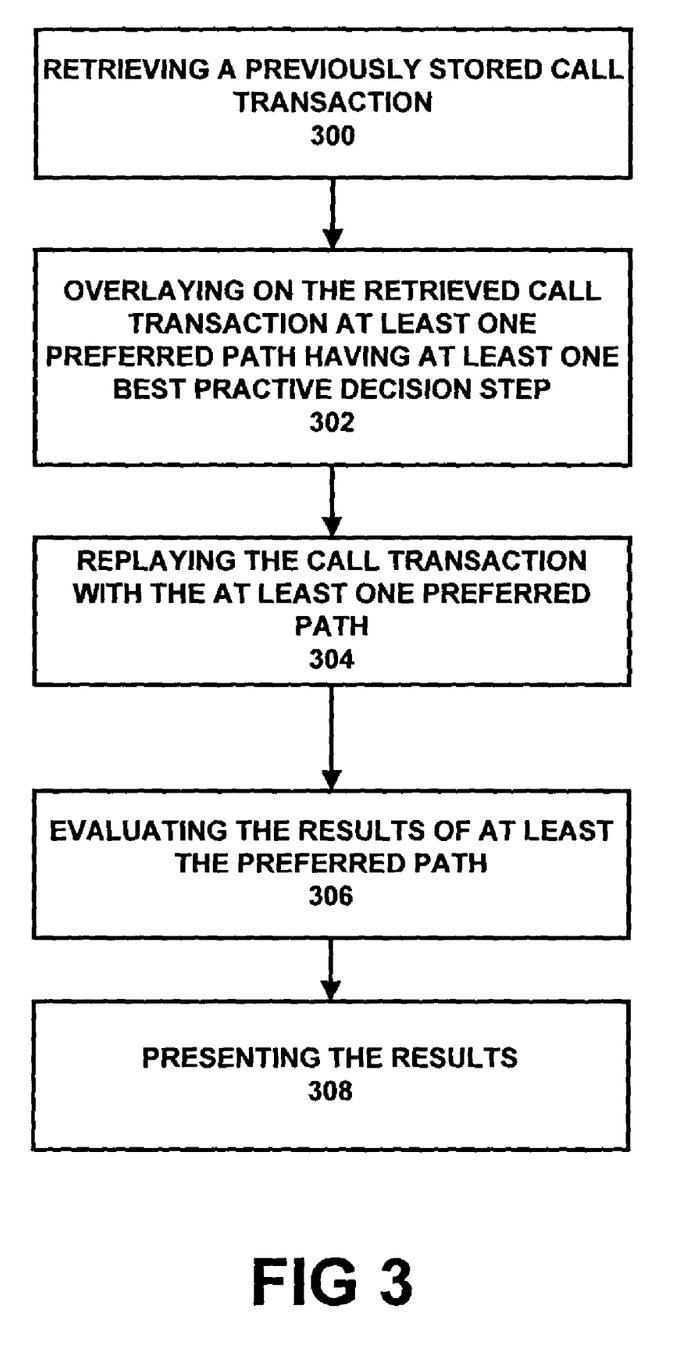
FIG. 3 is a flow diagram depicting an embodiment of an automatic call distribution system that teaches agents.

FIG. 3 is a flow diagram that depicts in general terms one embodiment of a method for teaching agents in an automatic call distribution system. In a first step 300, a previously stored call transaction is retrieved, for example, from a memory or storage (e.g. memory 11). The stored call transaction may in some embodiments have a plurality of dialog portions and decision points. The retrieved call transaction is overlaid, using speech recognition to record and translate speech and text, in the illustrated embodiment by at least one preferred path having at least one best practice decision step in step 302 of the method. Using a combination of pattern matching and artificial intelligence, the best practice question decision response sequence can be played for the agent. At step 304, the call transaction is replayed with at least one preferred path. The results are evaluated at step 306 and presented to the agent at step 308.

Figure 4:
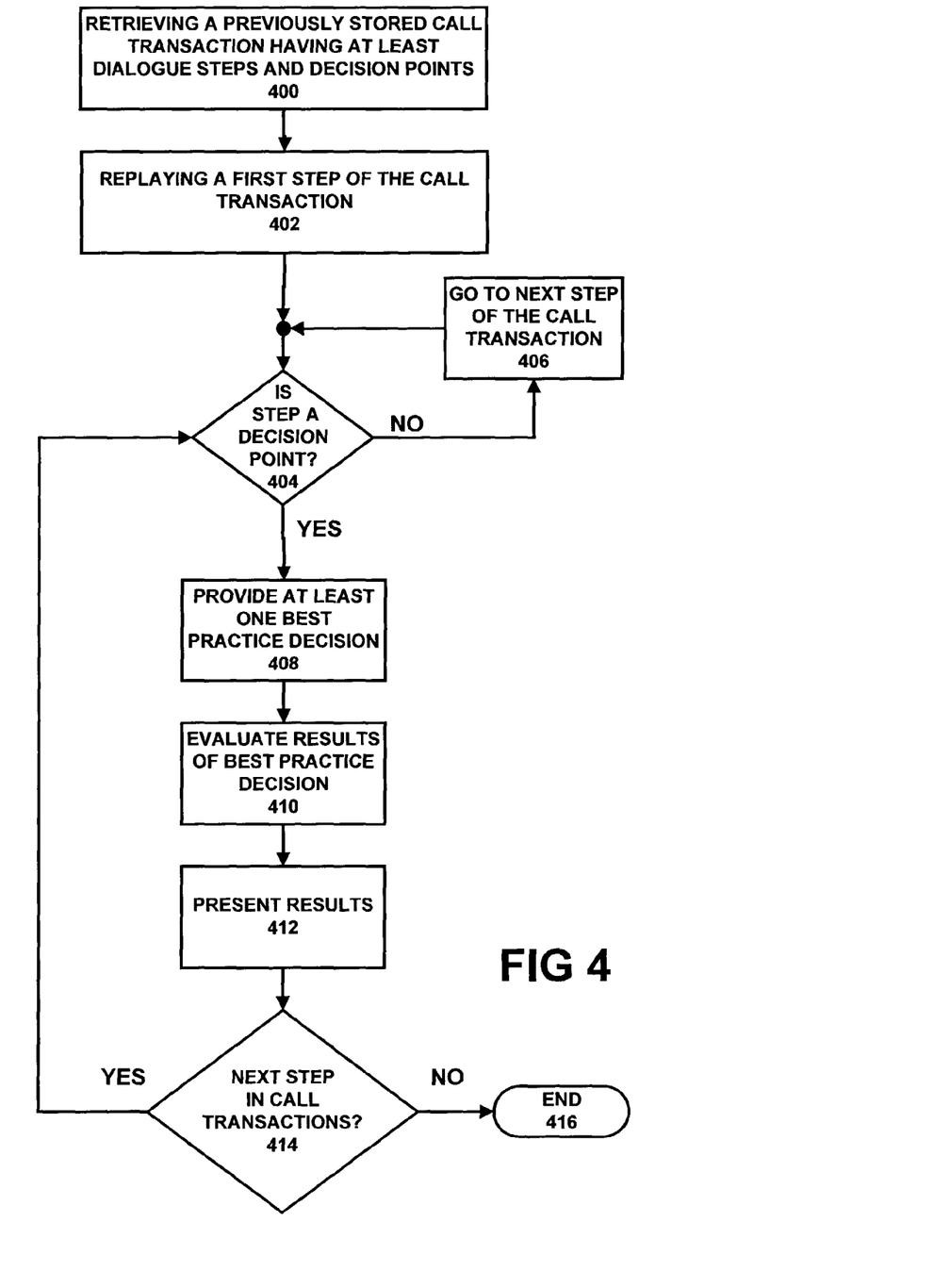
FIG. 4 is a more detailed flow diagram of an embodiment of an automatic call distribution system that provides agent teaching.

In one embodiment of the method, agents sequentially step through the call transaction with the overlaid best practice decision steps on the decision points of the call transaction. These best practice decision steps may comprise at least one of voice information, data information, and video information. Another embodiment of the method is depicted in the flow diagram of FIG. 4. In the first step 400, a previously stored call transaction having at least dialog steps and decision points is retrieved from a storage device. In step 402, a first step of the call transaction is replayed. At step 404, it is determined whether the step is a decision point. If it is not, then the next step of the call transaction is analyzed according to step 406 in the flow diagram of FIG. 4. When it has been determined at step 404 that a decision point is present, then at least one best practice decision is provided at step 408 and the results are evaluated for the best practice decision in step 410 and these results are then presented to the agent in step 412. The next step in the call transaction is then checked in step 414. If there is a next step, then the method returns to step 404, otherwise the procedure is terminated at end 416.

Figure 5:
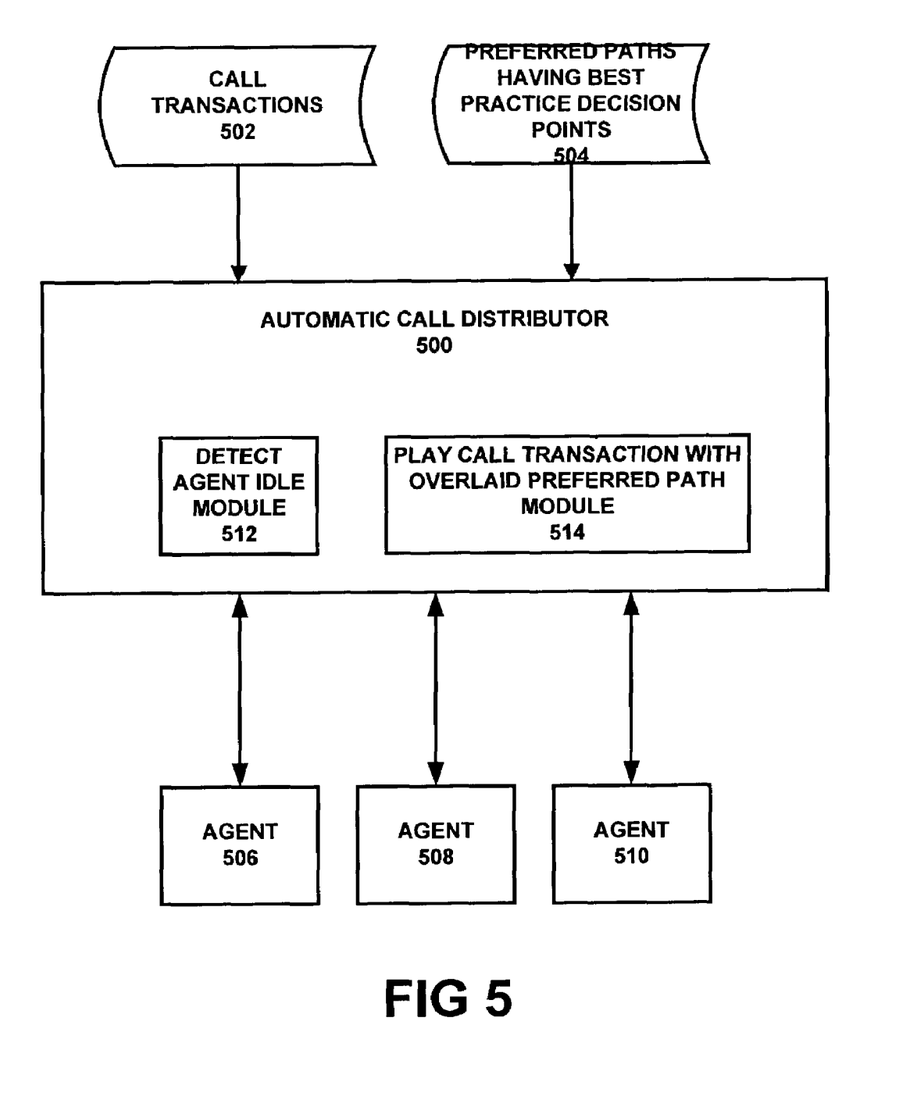
FIG. 5 is a functional block diagram depicting an example of communication system for use with an embodiment of an automatic call distribution system that provides agent teaching.

FIG. 5 depicts a block diagram of one embodiment of an apparatus that teaches agents in an automatic call distribution system. Call transactions may be stored in a database 502 and preferred paths having best practice decision points may be stored in a database 504. The databases 502 to 504 in the illustrated embodiment are operatively connected to the automatic call distributor 500. Also connected to the automatic call distributor 500 are agents 506, 508, and 510. An automatic call distributor 500 has a detect agent idle module 512 which detects when any of the agents 506, 508, and 510 are not engaged in a call transaction. Since the agent is idle, the time can be utilized for training the agent or improving his abilities in handling call transactions. The play call transaction with overlaid preferred path module 514 (the ranking of best practice results with the path receiving the highest score would direct the sequencing of decision points and dialogues) replays the stored call transaction selected by the agent and overlays preferred paths on this call transaction based on stored best practice call transactions. Thus, when the agent would otherwise have nothing to do, the agent can now spend time on improving his skills in handling call transactions.

Figure 6:
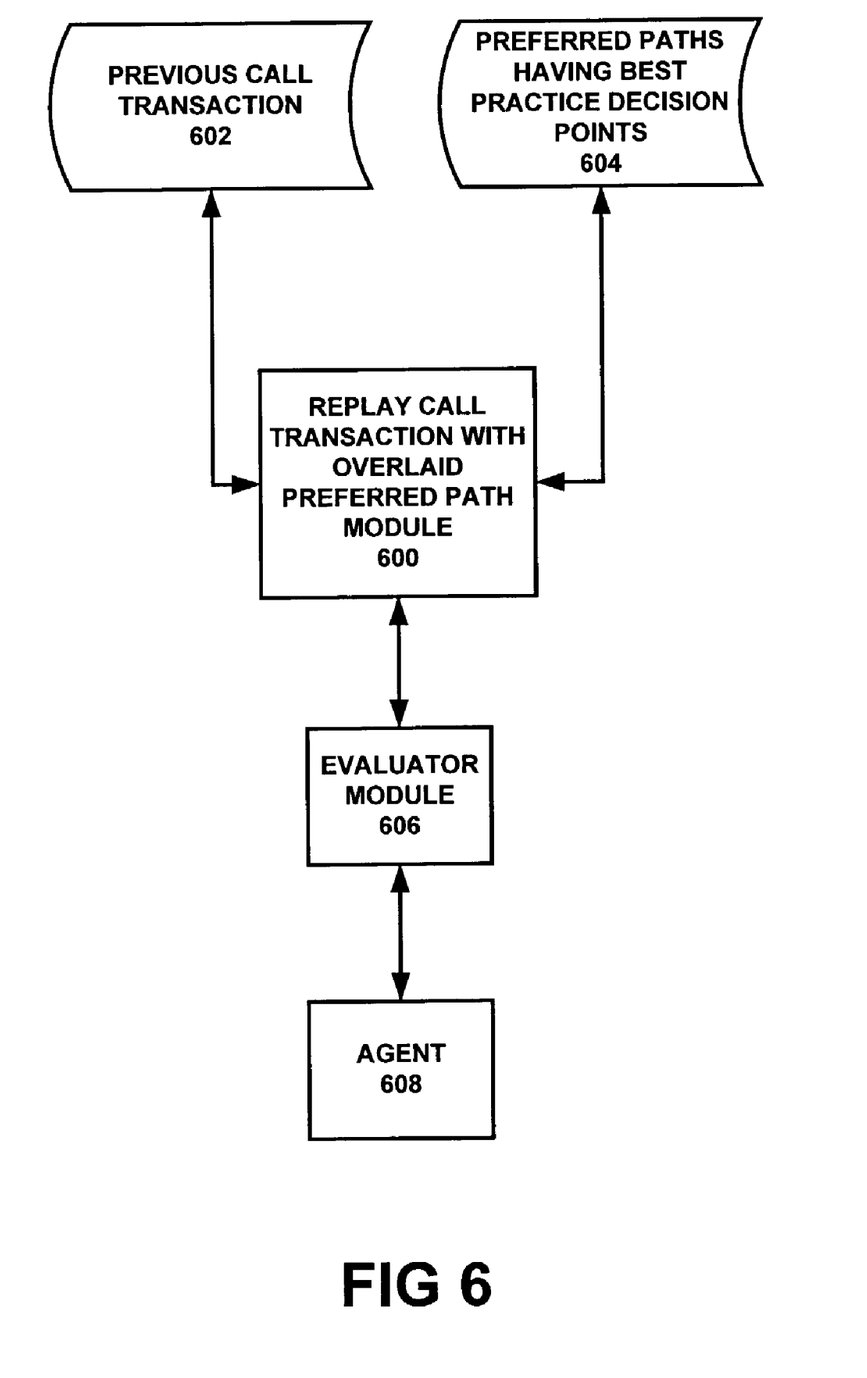
FIG. 6 is another block diagram depicting in more detail an embodiment of an automatic call distribution system that provides agent teaching.

FIG. 6 is another blocked diagram of another embodiment. As depicted in FIG. 6, a replay call transaction with overlaid preferred path module 600 is operatively connected to a previous call transaction database 602 and a preferred path having a best practice decision points database 604. The replay module 600 replays the selected call transaction with the overlaid preferred path and the results are evaluated in an evaluator module 606 and presented to an agent 608 for teaching the agent improved call transaction techniques.

Figure 7:
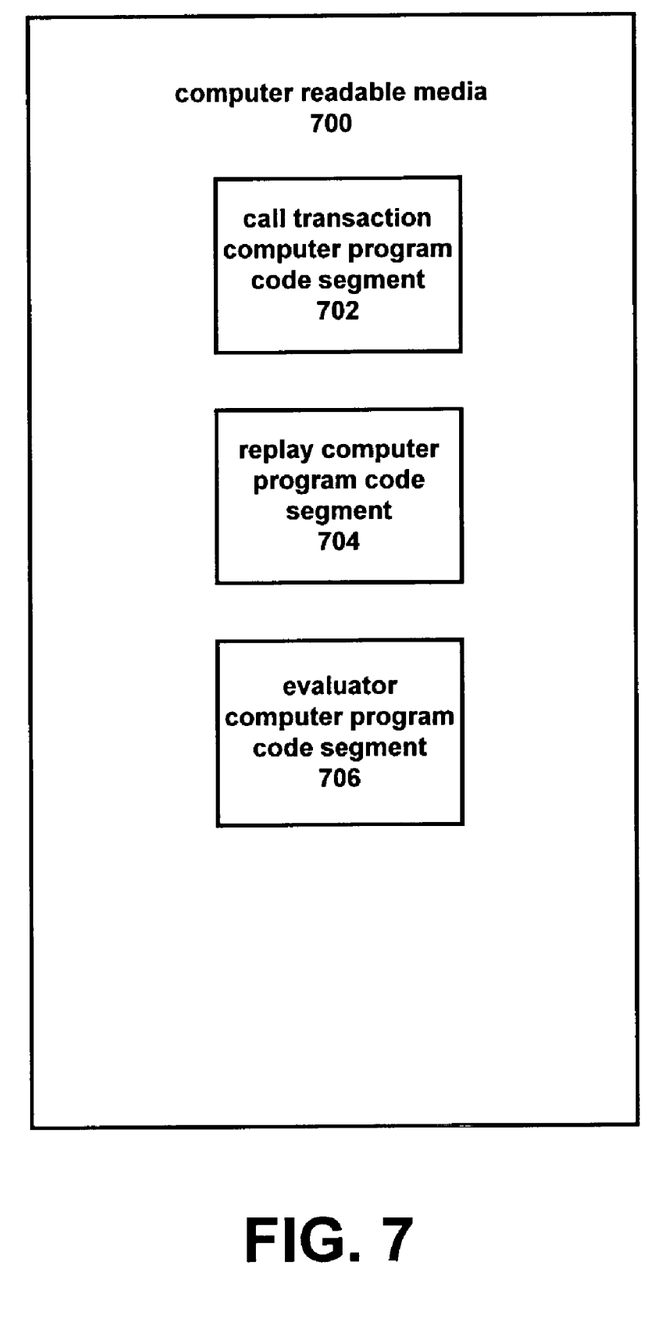
FIG. 7 is a depiction of a computer readable media having computer program code that implements an embodiment of an automatic call distribution system that provides agent teaching.

FIG. 7 is a diagrammatic illustration that depicts one example of a computer readable media 700 having program code. The computer readable media 700 may be any recording media suitable for recording computer readable code including but not limited to CD-ROM or DVD-ROM of various types, semiconductor memory, magnetic memory, optical memory, etc. As depicted in FIG. 7, call transaction computer program code 702 is provided that provides a previously stored call transaction having a plurality of dialog portions and decision points. A replay computer program code 704 replays the call transaction. During the replay, at least one decision at a respective decision point in the call transaction is simulated with a best practice point, which is different than an original decision at the respective decision point in the call transaction. Evaluator computer program code 706 evaluates the results of at least one decision and presents the results to an agent.

The present methods and apparatus overcome the drawbacks of prior art systems wherein the replay of call transactions with overlaid best practice decisions thereon is not available. This is a valuable teaching aid for the agents and significantly improves their handling of call transactions. Once an agent is familiar with the best practice approach, the calls could be of shorter duration resulting in increased sales and decreased costs.

For a telemarketing company, the contact zone between the customer and the agent is improved by having the agent follow the best course as determined by the company. The agent under the inventive method could use transactions to simulate different decisions and evaluate results to learn best practices. With embodiments of the present method and apparatus, the agent can establish a learning session and completed transactions with less than optimal results are sequentially delivered to the agent. The agent then steps through the transaction step by step and the system overlays best practice decision steps. This may include all aspects, such as voice, data, video, etc. of the call transaction.

It is to be understood, of course, that the present invention in various embodiments can be implemented in hardware, software, or in combinations of hardware and software.

The invention is not limited to the particular details of the apparatus and method depicted, and other modifications and applications are contemplated. Certain other changes may be made in the above-described apparatus and method without departing from the true spirit and scope of the invention herein involved. For example, although the invention is illustrated in the context of an automatic call distribution system, the invention is equally useable in other types of communication systems. For example, in an Internet based communication system the "call" transactions would involve audio, video, and text. Furthermore, it is envisioned that the present invention is usual in standalone systems wherein parties communicate with one another. It is intended, therefore, that the subject matter in the above depiction shall be interpreted as illustrative.

What is claimed is

1. A method for teaching agents in a communication system, comprising:
   providing a previously stored actual and original call transaction conducted with a customer at an earlier time having a plurality of dialog portions and decision points forming a transaction path to a business outcome;
   replaying the call transaction, and simulating at least one decision at a respective decision point in the call transaction which is different than an original decision at the respective decision point in the original call transaction wherein at least one decision point is a multiple branch decision point thereby forming a plurality of different connected transaction paths each having a different business outcome, each path having a plurality of dialog portions and a plurality of decision points and each path starting with a common dialog of the stored actual call; and
   evaluating the results of decisions of the agent at multiple decision points along the transaction path resulting from the decisions, and presenting the results to the agent.

2. The method according to claim 1, wherein the at least one decision is a best practice decision.

3. The method according to claim 1, wherein the method further comprises overlaying at least one preferred path on the stored original call transaction the preferred path having at least one best practice decision to provide a plurality of different transaction paths each having a plurality of dialog portions and decision points and each starting with a common dialog of the stored actual call.

4. The method according to claim 1, wherein the agent sequentially steps through the call transaction, and wherein the method further comprises overlaying best practice decision steps on the decision points of the stored original call transaction to form multiple branch decision points and at least one preferred best practice transaction path and at least one additional transaction path with at least one best practice decision.

5. The method according to claim 4, wherein the overlaying best practice decision steps comprises decision changes in real-time by the agent at selected decision points to determine the effect on the call transaction result.

6. The method according to claim 1, wherein the at least one decision in the simulating step and the evaluating step is a best practice decision.

7. The method according to claim 1, wherein the method further comprises automatically detecting when an agent is not engaged in a call transaction and automatically activating the replaying step in response thereto.

8. A method for teaching agents in an automatic call distribution system, comprising:
provided a previously stored actual call transaction conducted with a customer at an earlier time having a plurality of dialog portions and decision points forming a transaction path to a business outcome;
replaying the call transaction, and overlaying at least one preferred path on the stored actual call transaction, preferred paths having at least one multiple branch decision point thereby forming a plurality of different transaction paths starting with a common dialog of the stored actual call and each path having a different business outcome, each path having a plurality of dialog portions and a plurality of decision points; and
evaluating the results of the preferred paths at multiple decision points alone the preferred path, and presenting the results to the agent.

9. The method according to claim 8, wherein the agent sequentially steps through the call transaction, and wherein the method further comprises overlaying best practice decision steps on the decision points of the call transaction.

10. A computer readable medium containing computer program code comprising
call transaction computer program code that provides a previously stored actual call transaction conducted with a customer at an earlier time having a plurality of dialog portions and decision points forming a transaction path to a business outcome;
replay computer program code that replays the call transaction, and that simulates at least one decision at a respective decision point in the call transaction, which is different than an original decision at the respective decision point in the stored actual call transaction wherein at least one decision point is a multiple branch decision point thereby forming a plurality of different connected transaction paths each having a different business outcome, each path having a plurality of dialog portions and a plurality of decision points and each path starting with a common dialog of the stored actual call; and
evaluator computer program code that evaluates the results of the agent's decisions at multiple decision points alone the transaction path resulting from the decisions, and that presents the results to the agent.

11. The computer program readable medium according to claim 10, wherein the at least one decision is a best practice decision.

12. The computer program readable medium according to claim 10, wherein the computer readable media further comprises overlay computer program code that overlays preferred paths on the call transaction based on stored best practice call transactions.

13. The computer program readable medium according to claim 10, wherein the agent sequentially steps through the call transaction, and wherein the computer readable media further comprises overlay computer program code that overlays best practice decision steps on the decision points of the call transaction.

14. The computer program readable medium according to claim 13, wherein the best practice decision steps comprise at least one of voice information, data information, and video information.

15. An apparatus that teaches agents in a communication system, comprising:
means for providing a previously stored actual call transaction conducted with a customer at an earlier time having a plurality of dialog portions and decision points forming a transaction path to an outcome;
means for replaying the call transaction, and simulating at least one best practice decision at a respective decision point in the stored actual call transaction, which is different than an original decision at the respective decision point in the stored actual call transaction wherein at least one decision point is a multiple branch decision point which forms a plurality of different connected transaction paths each having a different outcome, each path having a plurality of dialog portions and a plurality of decision points and each path starting with a common dialog of the stored actual call; and
means for evaluating the results of decisions of the agent at multiple decision points along the transaction path resulting from the decisions, and presenting the results to the agent.

16. The apparatus according to claim 15, wherein the apparatus further comprises means for overlaying preferred paths on the call transaction based on stored best practice call transactions.

17. The apparatus according to claim 15, wherein the agent sequentially steps through the call transaction, and wherein the apparatus further comprises means for overlaying best practice decision steps on the decision points of the call transaction.

18. The apparatus according to claim 17, wherein the best practice decision steps comprise at least one of voice information, data information, and video information.

19. An apparatus that teaches agents in an automatic call distribution system, comprising:
means for providing a previously stored actual call transaction conducted with a customer at an earlier time having a plurality of dialog portions and decision points forming a transaction path to an outcome;
means for replaying the call transaction, and overlaying preferred paths on the call transaction, the preferred path having at least one stored best practice multiple branch decision point thereby providing a plurality of different transaction paths starting with a common dialog of the stored actual call and each path having a different outcome, each path having a plurality of dialog portions and a plurality of decision points; and means for evaluating the results of the preferred paths at multiple decision points along the preferred path, and presenting the results to the agent.

20. The apparatus according to claim 19, wherein the agent sequentially steps through the call transaction, and wherein the apparatus further comprises means for overlaying best practice decision steps on the decision points of the call transaction.

21. An apparatus that teaches agents in an automatic call distribution system, comprising:

a memory having at least one previously recorded actual call transaction conducted with a customer at an earlier time having a plurality of dialog portions and decision points forming a transaction path to an outcome;

a replay module operatively connected to the storage, the reply module replaying the previously recorded call transaction, and overlaying at least one preferred path on the recorded actual call transaction, the preferred path having at least one stored multiple branch decision point to provide a plurality of different transaction paths starting with a common dialog of the recorded actual call and each path having a different outcome, each path having a plurality of dialog portions and a plurality of decision points; and an evaluator operatively connected to the replay module, the evaluator evaluating the results of the preferred paths at multiple decision points along the preferred path, and presenting the results to the agent.

22. The apparatus according to claim 21, wherein the agent sequentially steps through the call transaction, and wherein the replay module comprises an overlay module that overlaying best practice decision steps on the decision points of the call transaction.

23. The apparatus according to claim 22, wherein the call transaction is a complete call transaction with less than optimal results and the best practice decision steps comprise at least one of voice information, data information, and video information.

* * * * *